United States Patent [19]

Parson

[11] Patent Number: 4,848,830
[45] Date of Patent: Jul. 18, 1989

[54] COMBINED PICKUP TRUCK AND DISAPPEARING CAMPER

[76] Inventor: Gary W. Parson, 745 E. 400 South, Orem, Utah 84057

[21] Appl. No.: 184,065

[22] Filed: Apr. 20, 1988

[51] Int. Cl.⁴ ................ B62D 33/08; B62D 31/00; B60P 7/02; B60P 3/42
[52] U.S. Cl. ................ 296/165; 296/26; 296/100; 296/173
[58] Field of Search ................ 296/165, 164, 26, 100, 296/10, 173

[56] References Cited

U.S. PATENT DOCUMENTS

| | | | |
|---|---|---|---|
| 3,151,908 | 10/1964 | Horst | 296/100 |
| 3,367,347 | 2/1968 | Smith | 296/100 |
| 3,458,232 | 7/1969 | Frank | 296/27 |
| 3,649,073 | 3/1972 | Whittemore | 296/100 X |
| 3,690,719 | 9/1972 | Yount | 296/164 |
| 4,284,303 | 8/1981 | Hather | 296/100 |
| 4,768,824 | 9/1988 | Andonian | 296/165 |

Primary Examiner—Joseph F. Peters, Jr.
Assistant Examiner—James M. Kannofsky
Attorney, Agent, or Firm—B. Deon Criddle

[57] ABSTRACT

The invention relates to a pickup truck having a cab and a bed with a disappearing camper built into the bed, i.e., one which has a lower concealed position and an upper camper position with each side wall of the camper being made in three sections from panel material such as plywood, fiber glass, plastic, etc., having at least a part thereof made of transparent material to serve as windows for the camper. Each side wall has four support rods, one secured to the front edge of the front section, a second secured to the back edge of the front section and the front edge of the middle section, a third secured to the back edge of the middle section and the front edge of the back section, and a fourth secured to the back edge of the back section. The middle section is of variable height to accomodate the rear wheel humps in the bed. Three embodiments of means to raise and lower the camper are disclosed, viz., (1) a rack associated with at least two of the support bars on each side and a piston gear in mesh with the rack which is driven by an electric motor, (2) two rods pivoted at their lower ends to the bed and having a roller at the upper ends to move on an arc in a horizontal track at the lower edges of the front and back sections and means to move the rods clockwise and counterclockwise to raise and lower the sides, and (3) two scissor lifters on each side with means to move them to lifting and lowering position. The back wall is a tailgate pivoted for horizontal or vertical movement to form a door for the camper. A removable sectional top is provided for the camper which can also serve as a cover for the bed.

29 Claims, 5 Drawing Sheets

COMBINED PICKUP TRUCK AND DISAPPEARING CAMPER

The present invention relates to a combined pickup truck and a disappearing camper. By "disappearing" is meant a camper which can be moved from a lowered position hidden by the side and end walls of the bed of the truck to a raised position in which the vehicle is a camper. In the lowered position the pickup can be used the same manner as if the camper were not combined with it but with the added advantage that the bed of the truck can be covered, if desired, with a removable cover over the top of the side walls which, in raised position, is the top of the camper.

BACKGROUND OF THE INVENTION

It has previously been proposed in U. S. Pat. No. 3,151,908 issued to Horst on Oct. 6, 1964 to combine a pickup truck having a cargo bed defined by the cab, side and back walls with a top that can rest on the upper edge of the side walls as a cover for the cargo bed or be elevated by posts to provide space for a camper which can be closed by curtains on the sides and rear. The lower ends of the posts fit into sockets in the side walls. This proposal has not been accepted by the public, probably because of the bother of fastening the posts to the top when it is to be used in elevated position and the poor weatherproofing provided by curtains.

A further prior proposal in U. S. Pat. No. 3,367,347 issued to Smith on Feb. 6, 1968, is to combine a pickup truck bed with a cover that can be converted into a tent. It suffers from much the same inadequacies as Horst.

Another prior proposal in U. S. Pat. No. 3,458,232 issued to Frank on July 29, 1969, is to combine a pickup truck bed with a plurality of hinged and pivoted panels to construct a box-like enclosure above the side and end walls of the bed. There has been no substantial public acceptance of this proposal, probably because the parts take up so much room in the bed of the truck that it must be used either as a camper or truck but not a true combination vehicle.

Still a further proposal in U. S. Pat. No. 3,649,073 issued to Whitmore on Mar. 14, 1972, is to provide a cover for the bed of a pickup truck which can be raised from a lower position on top of the side and rear walls of the bed to an upper position but this leaves the sides and ends open. It is unsuitable for a camper.

Other similar proposals with modifications in the means for lifting the cover from its lower to upper positions, or for supporting a fabric cover, have been made, all of which are evidence of a long felt but unfulfilled need for a truly combined pickup truck and built-in camper which does not detract significantly from the carrying capacity of the truck and which can convert it into a true camper without bother.

SUMMARY OF THE INVENTION

The invention is a combined pickup truck and camper comprising a truck having a cab and a bed which includes front, side and end walls, and a floor, vertically movable form retaining panels having a lower stored position and an upper camper position, means to move the panels up and down to said respective positions, and a top comprising transverse sections flexibly joined together at their sides which is capable of (a) storage in the bed just back of the cab with the sections face to face, (b) covering the bed with the sections side by face when the panels are in the lower position, and (c) covering the camper with the sections side by side when the panels are in the camper position.

The side walls of the truck may consist of a single piece of metal, glass, fiber glass, or the like but preferably is constructed of an outer wall and a spaced inner wall with a well between them in which the side panels are located in their down position.

The back wall of the bed preferably is a tail gate hinged to the body of the truck at an end to open horizontally or at the bottom to open vertically, as is customary for pickup trucks.

The panels may be made of any suitable material, e.g., sheet metal, glass, fiber glass, transparent or opaque plastic, plywood, and the like. Where the panel material is not transparent, it is preferable to include a transparent portion to serve as a window for the camper.

Most pickup trucks have the bed mounted on the chassis low enough that covered wheel wells have to be provided in the bed for the rear wheels which make humps in the bed adjacent to the side walls and intermediate the ends thereof. In order to provide a side wall for the camper with a straight upper edge from end to end, the lower edge has to have a recess in it to receive the hump. For this reason the side panels are made in three sections, front, intermediate and rear. In stored position, the front and rear sections reach the floor of the bed while the intermediate section reaches the top of the hump. Four support members combine these three sections into an integral side wall, one connected to the front edge of the front section, a second secured to the rear edge of the front section and the front edge of the intermediate section, a third secured to the rear edge of the intermediate section and the front edge of the rear section and the fourth secured to the rear edge of the rear section, making an integral side wall. All of the support members have an upper portion secured to each adjacent panel and a lower portion slidably secured to the upper portion, and at least two of the support members, preferably the first and fourth support members, include drive means to raise and lower them and the integral side wall of which they are a part.

At least the intermediate or center section of the side wall comprises at least two relatively vertically slidable parts so that the center section can rest on top of the hump while the front and rear sections rest on the floor of the bed in the stored or lower position and yet form a complete side wall in camper or raised position. If it is desired to have a tall camper, all three side sections may be made of a plurality of relatively vertically slidable parts which overlap each other in the stored position and are related one above the other in raised position.

The means for raising and lowering the side walls is preferably an electric motor such as is used to raise and lower windows in the doors of motor vehicles. Electricity is provided to the motor from the source of electricity for the truck through a switch, preferably conveniently located in the cab for a driver to operate manually.

The top comprises a plurality of transverse sections, each section being no wider than the side walls of the truck are high, which are so connected together that they may form a watertight cover for the bed when the panels are in the stored or lower position and for the camper when the panels are in raised or camper position, and can lie face to face just behind the cab in stored position. The cab can conveniently form the front wall of the bed but, if desired, a front wall of the same height as the side walls may be provided just back of the cab and preferably a transverse wall spaced from the cab or front wall is provided to form a storage well for transverse panels of the top member stacked face to face in stored position.

BRIEF DESCRIPTION OF THE DRAWINGS.

The invention will be described in conjunction with the drawings which illustrate various embodiments of the invention and in which.

DETAILED DESCRIPTION OF PREFERRED EMBODIMENTS OF THE INVENTION

Figure 1:
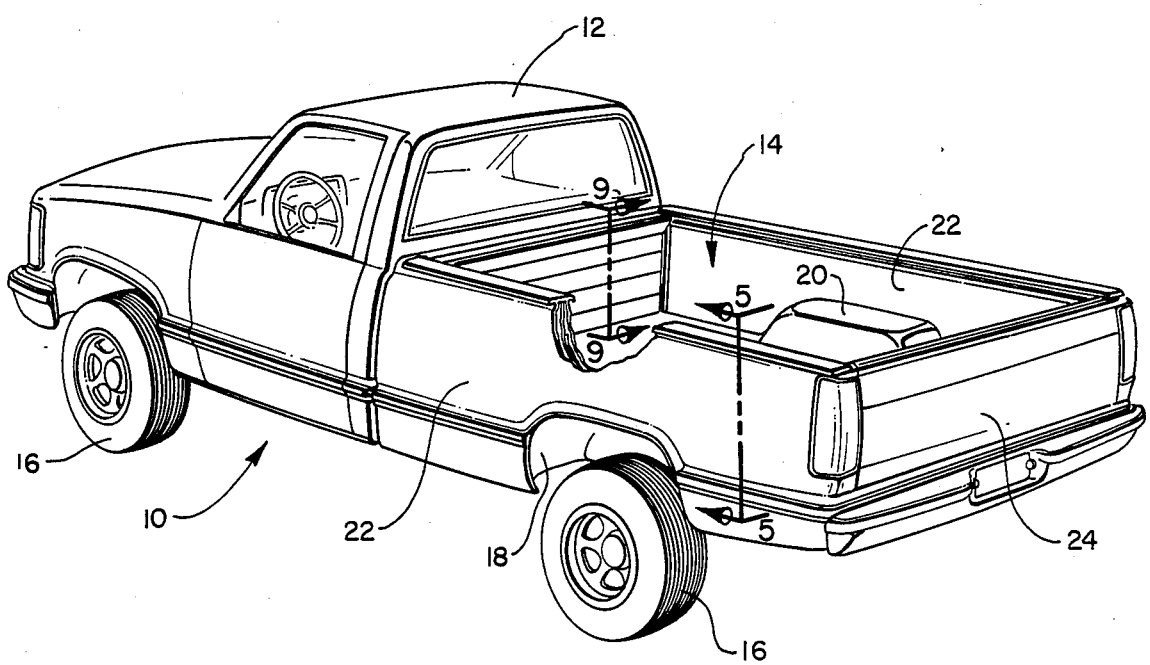
FIG. 1 is a perspective view from the left rear corner of the combined truck and camper with the camper in the lowered position.

Referring first to FIG. 1, reference number 10 refers generally to the pickup truck having a cab 12, bed 14, wheels 16, a well 18 for the left rear wheel and a hump 20 for the right rear wheel in the bed of the truck. A similar well for the right wheel is provided on the right side of the truck and a similar hump is provided in the bed 14 for the left wheel. The bed comprises side walls 22 and a rear wall 24 in the form of a tailgate having hinges (not shown) either at a side for a horizontally swinging tailgate or at the bottom for a vertically swinging tailgate. The camper is in lowered or retracted or concealed position in FIG. 1.

Figure 2:
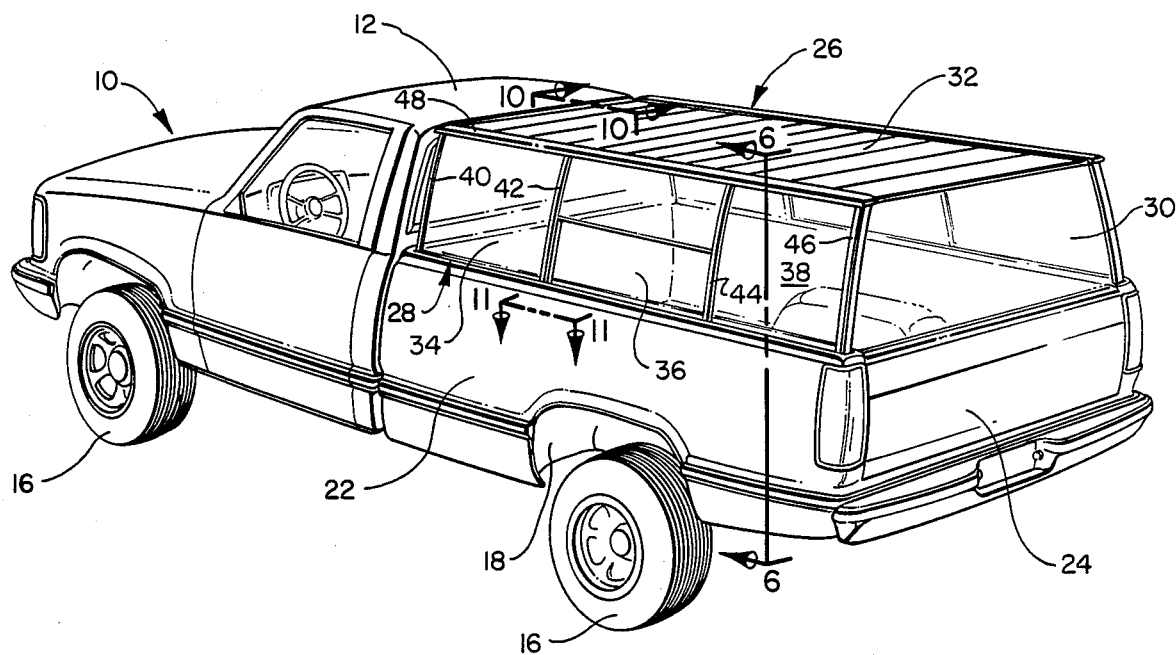
FIG. 2 is a similar perspective view with the camper in raised or camper position.
Figure 5:
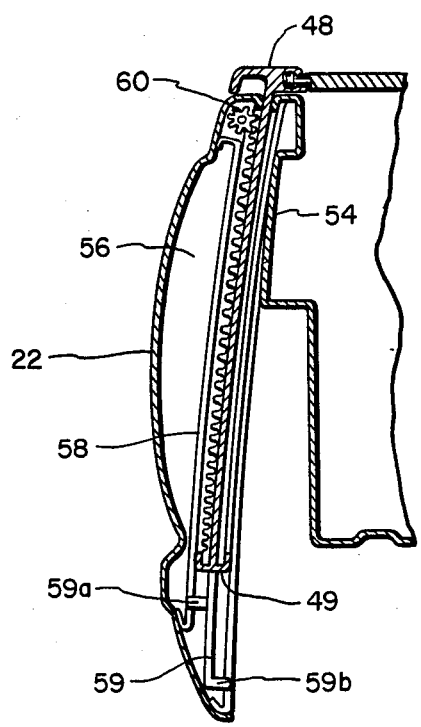
FIG. 5 is a vertical sectional view of one embodiment of side wall through the wheel well on the line 5—5 of FIG. 1.
Figure 6:
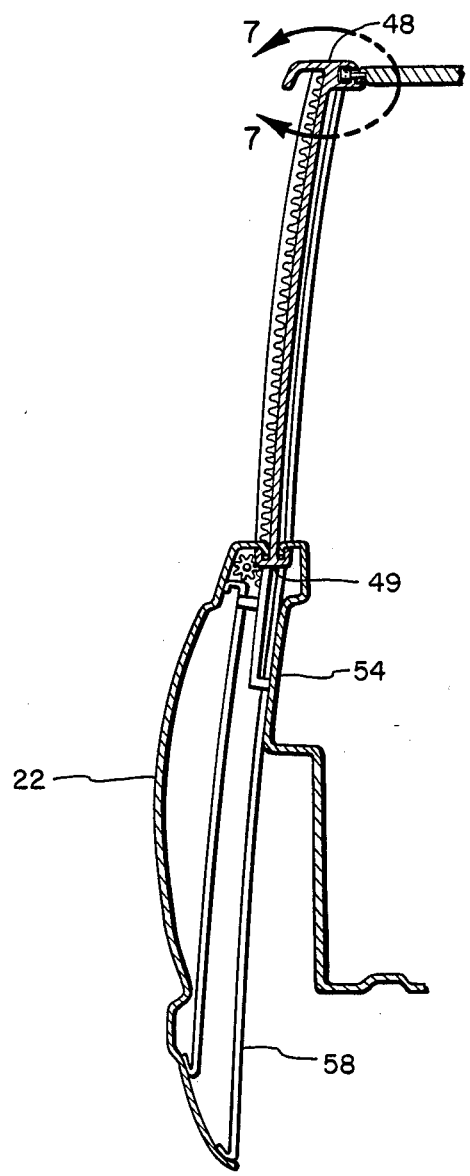
FIG. 6 is a vertical sectional view of another embodiment of side wall with the camper in raised position on the line 6—6 of FIG. 2.
Figure 7:
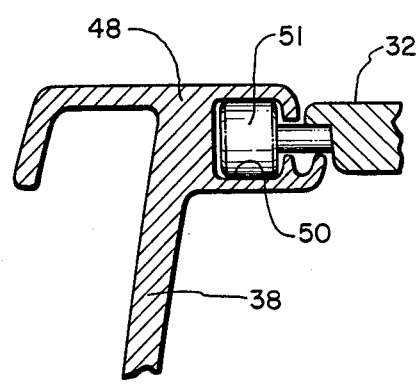
FIG. 7 is a fragmentary vertical sectional view of the upper corner of the left panel in camper position along the line 7—7 of FIG. 6.

Referring now to FIG. 2, the camper 26 is illustrated in raised or camper position. It comprises side panels 28, a rear or end panel 30 and a top 32. Each side panel 28 comprises three sections, a front section 34, a center or middle section 36 and a rear or back section 38, a first support member 40 secured to the front edge of section 34, a second support member 42 secured to the rear edge of section 34 and the front edge of section 36, a third support member 44 secured to the rear edge of section 36 and the front edge of section 38, and a fourth support member 46 secured to the rear edge of section 38. The top edges of sections 34, 36 and 38 and the upper ends of support members 40, 42, 44 and 46 form a straight line and are secured to a top rail 48 as seen in FIGS. 5, 6 and 7. Rail 48 preferably is a metal extrusion having a groove 50 on its inner side and an L-shaped projection 52 on its outer side that fits over the top edge of the side wall 22 of the bed 14 when the camper is in the lowered position, as seen in FIGS. 5 and 7. The front section 34 and the rear section 38 each has a bottom rail 49 secured to the lower edge thereof, as seen in FIGS. 5 and 6.

Figure 3:
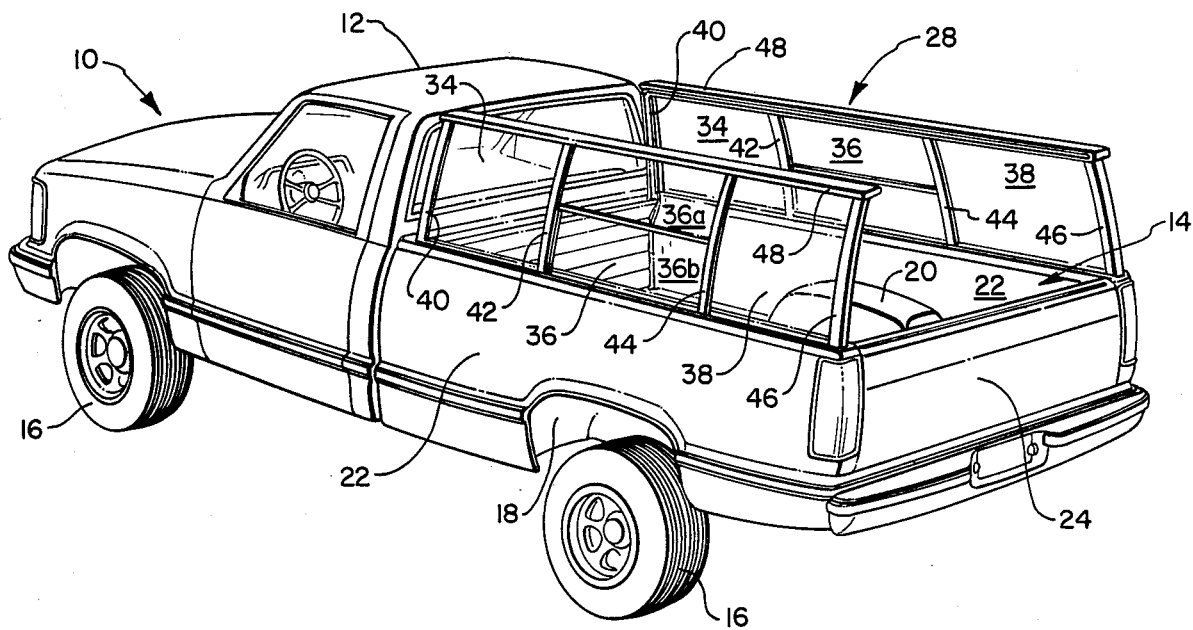
FIG. 3 is a similar perspective view with only the side panels in raised position.

Referring now to FIG. 3, it will be seen the hump 20 is located adjacent to the right side wall 22 at an intermediate position between its front and back ends, that the front section 34 of the side panel has a width corresponding substantially to the distance from the front end of the bed 14 to the front end of the hump 20, that the center section 36 of the side panel has a width corresponding substantially to the length of the hump 20 from front to back, and that the width of the back side panel section 38 corresponds substantially to the distance from the back of the hump 20 to the inner side of the tailgate 24. The left side wall is a mirror image of the right side wall.

The side panel sections 34, 36 and 38 are preferably made of a transparent plastic material which needs to be surrounded by a stiff frame to give the panel sections the rigidity they need to function properly. Such a frame may be provided by a front support rod 40 having a groove in which the front edge of side panel section 34 is secured; a first intermediate support rod 42 having a first grove in which the rear edge of side panel section 34 is secured and a second groove in which the front edge of side panel section 36 is secured; a second intermediate support rod 44 having a first groove in which the rear edge of side panel section 36 is secured and a second groove in which the front edge of side panel section 38 is secured; and a back support rod 46 having a groove in which the rear edge of side panel section 38 is secured. The upper ends of support rods 40, 42, 44 and 46 are secured to the top rail 48 to which the side panel sections 34, 36 and 38 are also attached. See FIGS. 3, 5, 6, 7 and 8. The groove 50 in top rail 48 forms a track for rollers 51 attached to top 32 (FIG. 7) and the flange 52 on the other side forms, in the lowered position of the camper, a cover for the well 26 in the side walls 22. See FIGS. 1, 4, 5 and 8.

Figure 8:
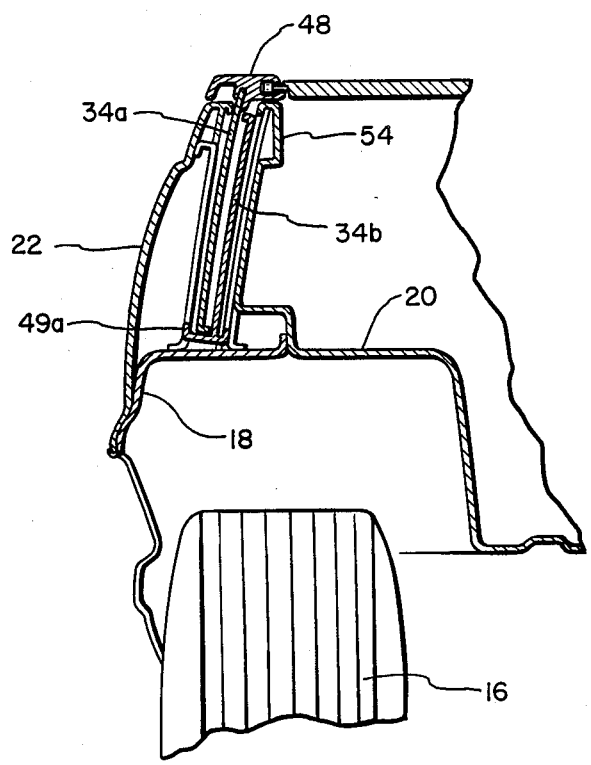
FIG. 8 is a vertical sectional view through the left side wall and wheel well with the camper in lower position and the top pulled over the bed of the truck along the line 8—8 of FIG. 3.

The center section 36 of the side panels cannot be as wide as the front and back sections in the lowered position of the camper because of the humps 20 yet it needs to be as wide as they are in the raised or camper position. This change in width of the center section 36 is accomplished by making it of two relatively vertically movable parts 36a and 36b which, in the raised position, have the lower edge of the upper part 36a and the upper edge of the lower part 36b essentially in alignment while in the lowered position they overlap. Upper part 36a is secured at its upper edge to top rail 48 while the lower edge of lower part 36b is secured to a lower rail 49a, as seen in FIG. 8. The weight of lower part 36b brings it to the position shown in FIGS. 2 and 3 as the side panel 28 is raised to the camper position. As side panel 28 is being lowered, the lower rail 49a on the lower edge of lower part 36b comes in contact with the top of hump 20 which stops its downward movement while the top part 36a and the front and back sections continue to descend, thus bringing these two parts 36a and 36b into overlapping relation, as seen in FIG. 8, by the time the descent of the other parts ends.

Figure 4:
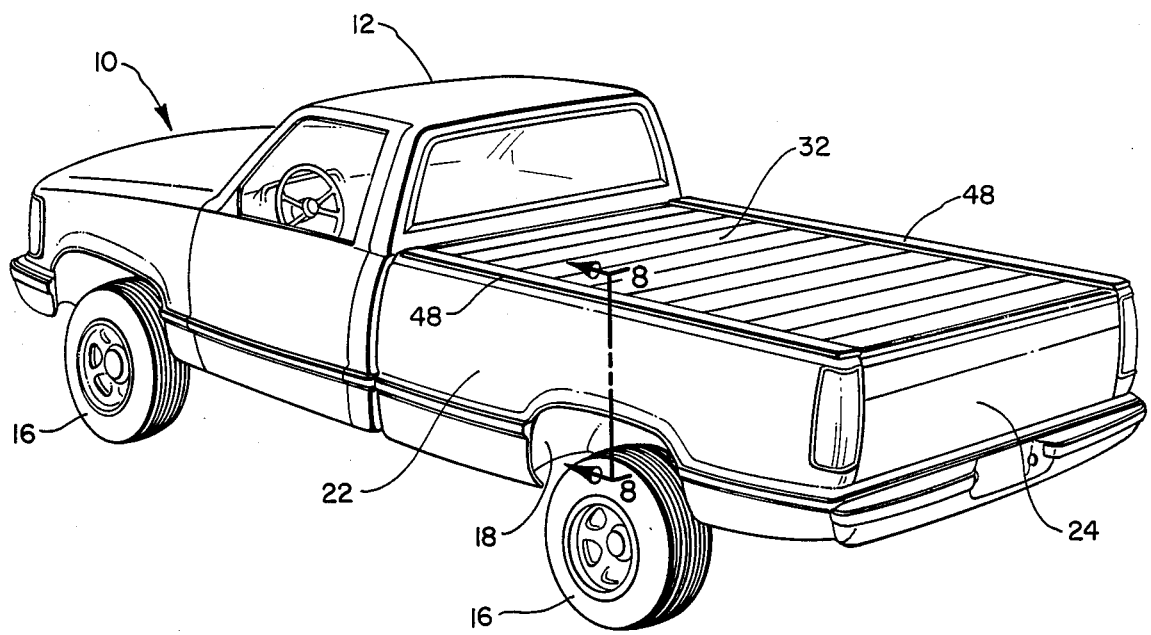
FIG. 4 is a similar perspective view with the top covering the bed of the truck.

Referring now to FIG. 4, the camper is in the lowered or storage or concealed position out of sight and the top 32 is shown in pulled out position in which it provides a waterproof cover for the bed 14.

Referring now to FIG. 5, the bed 14 has an optional inner side wall 54 spaced inwardly from the side wall 22 to form a well or recess 56 into which the side panel 28 slides as it is moved to the lowered position of the camper. The back wall or tailgate 24 has a similar inner wall and well or recess. These inner side walls are desirable where loose material is to be carried in the bed 14 of the truck 10 to keep the pathway of up and down movement of the side panels 28 and rear panel 30 clear of such material which would interfere with the up and down movement thereof.

As seen in FIG. 5, a guide 58, e.g., in the form of a channel, is provided in the well 56 at the front end of side wall 22 in and through which support bar 40 at the front edge of the side panel section 34 moves. A similar guide is provided at the rear of the well 56 in and through which the support bar 46 at the rear edge of the side panel section 38 moves. A support rod 59 is preferably provided on the lower end of each of the support bars to steady the side panels 28 in the raised or camper position. It has a forwardly extending arm 59a and a rearwardly extending arm 59b which slidably engage the walls of channel 58. The guides 58 arms 59 also serve to prevent rattling of the side panel 28 in its lowered position.

Any suitable means for raising and lowering the camper may be provided and three embodiments of such means are illustrated and described.

Figure 11:
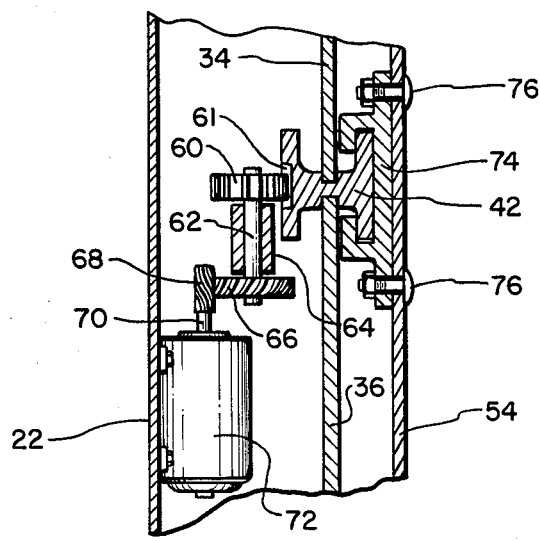
FIG. 11 is a cross sectional view through a support member for the camper side panel showing the guide for it and the electric motor with a pinion gear on its drive shaft engaging the rack in the support member.

The first embodiment, which is illustrated in FIGS. 5, 6 and 11, includes teeth 61 forming a rack in two or more of the support members 40, 42, 44 and 46. A pinion gear 60 is in mesh with each rack, as best seen in FIG. 11 which shows the teeth 61 in support rod 42 to which sections 34 and 36 are secured, as described. Each gear 60 is secured on one end of a shaft 62 which is rotatably mounted in a fixed bearing 64. A worm gear 66 is secured on the other end of shaft 62. Worm gear 66 is in mesh with a worm 68 secured to the end of shaft 70 of a reversible electric motor 72, such as is used for raising and lowering windows of automobiles. It is connected to the electrical system of the vehicle through a control switch (not shown), preferably located in the cab 12 in a position convenient for the driver to operate. FIG. 11 also illustrates a satisfactory guide 74 for the central support members 42 and 44 which may be secured to the inner walls 54 by bolts 76.

Figure 12:
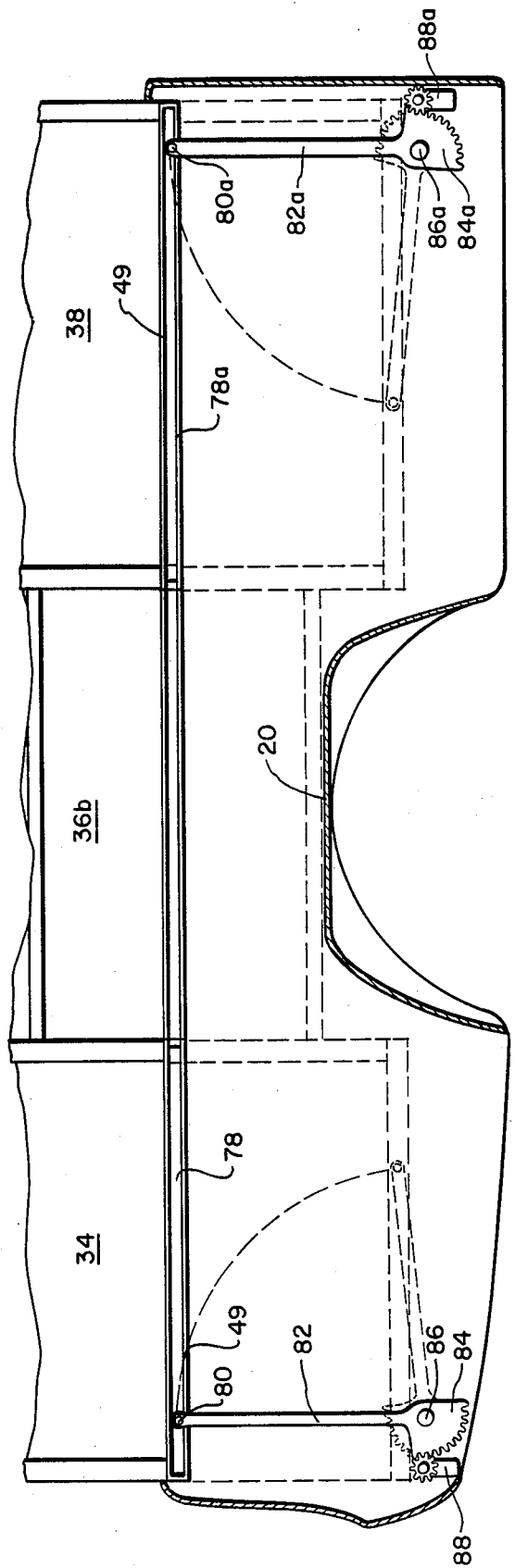
FIG. 12 is a vertical sectional view of a second embodiment of mechanism for lifting and lowering the side panels.

A second embodiment of side wall lifting and lowering mechanism is illustrated in FIG. 12. It includes at the left end a groove 78 formed in the lower rail 49 of section 34 in which a roller 80 pivoted to the upper end of a rod 82 is slidable. The lower end of rod 82 is rigidly fastened to a segmental gear 84 and pivoted at 86 to the side wall of the truck. Each gear 84 is driven by a motor and gear train 88 similar to that shown in FIG. 11. A similar arrangement of parts is provided at the right end in which the parts bear the same reference numbers with a postscript a. Starting in the position shown in FIG. 12, actuation of motor and gear train 88 causes segmental gear and attached rod 82 to rotate clockwise causing roller 80 to move in the arc shown. Simultaneously segmental gear 84a and attached rod 82a are being driven counterclockwise causing roller 80a to move in the arc shown. These combined movements cause the side panel to be moved from the camper position to the lower position as shown in the dashed lines.

Figure 13:
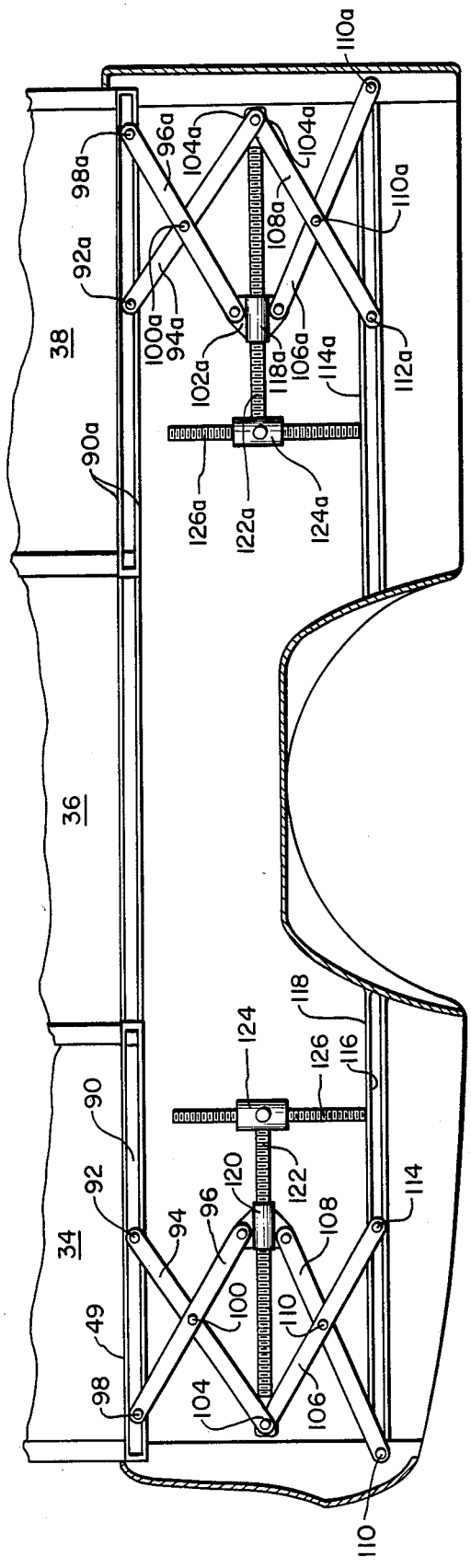
FIG. 13 is a vertical sectional view of a third embodiment of mechanism for lifting and lowering the side panels.

A third embodiment of raising and lowering mechanism is shown in FIG. 13 in which the three sections 34, 36 and 38 of a side panel are shown. Referring first to the left side of FIG. 13, bottom rail 49 is provided with a groove 90 in which a roller 92 is movable right and left. Roller 92 is mounted on the upper end of one arm 94 of an upper scissor whose other arm 96 is secured to a fixed pivot 98 at its upper end and the two arms are pivoted together at their centers by pin 100. The lower end of arm 94 is pivoted to a member 104 which includes a socket for a purpose to be described. One arm 106 of a lower scissor is also pivoted to member 104 at its upper end. It is also pivoted at its center to the center of a second arm 108 by a pin 110. The lower end of arm 108 is pivoted to a fixed pin 112. The lower end of arm 106 is provided with a roller 114 which is slidable in a groove 116 in a channel member 118 suitably mounted horizontally in the well. The lower end of arm 94 and the upper end of arm 108 are pivoted to a threaded bushing 120 in which a threaded rod 122 is rotatable. The left end of rod 122 has a ball rotatably mounted in socket 104 previously described which holds it against longitudinal movement. Rod 122 is driven in both clockwise and counter clockwise directions by a motor and gear train 124 similar to that illustrated in FIG. 11. Rotation of threaded rod 122 in one direction moves bushing 122 to the right while rotation in the other direction moves it to the left. Movement to the left opens the scissors and causes section 34 to rise while movement to the right closes the scissors and causes section 34 to lower. A motor and gear train 124 mounted for sliding movement on a vertical rod 126 drives the rod 122 in both directions upon operation of an electrical control (not shown). The slidable connection of 124 on vertical rod 126 is necessary as rod 122 moves up and down with the opening and closing of the scissors.

A similar scissor mechanism is provided at the right end of the well which is the mirror image of the one at the left end of the well and the parts bear the same reference numerals with the addition of a postscript a which do not need to be further described. The two scissor mechanisms in each well are adapted to move the side panels from the stored position to the camper position and back again, as desired.

Figure 9:
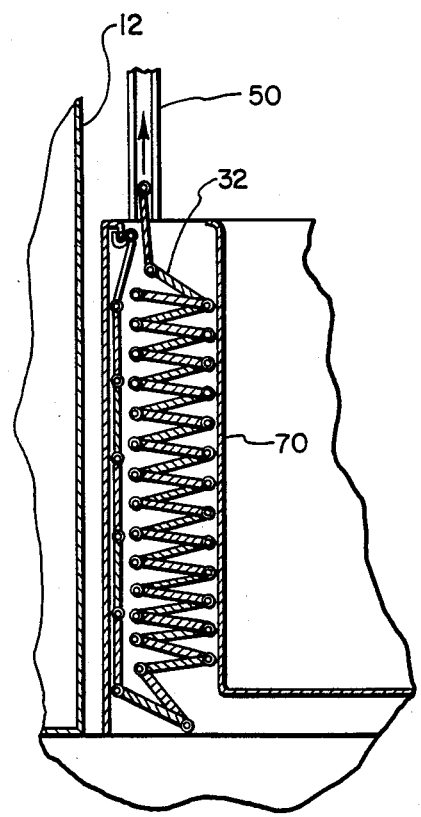
FIG. 9 is a fragmentary vertical sectional view of the retracted top in its storage well between the back wall of the cab and a spaced inner wall along the line 9—9 of FIG. 1.
Figure 10:
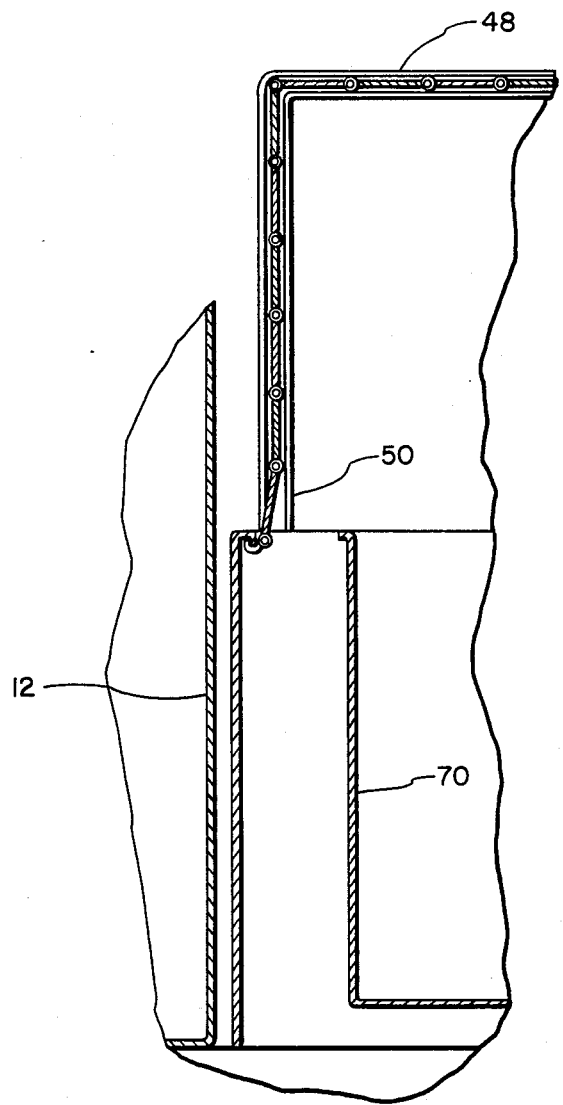
FIG. 10 is a fragmentary vertical sectional view of the top member moved out of its well into operative position along the line 10—10 of FIG. 2.

The top 32 is shown in FIG. 9 in stored position with the sections folded in a compartment 70 adjacent to the cab 12 from which it may be pulled as guided by the grooves 50 into the top members 48 where it serves as the cover for the bed 14 as illustrated in FIG. 4 or for the camper as shown in FIG. 2, leaving the compartment 70 empty as illustrated in FIG. 10.

While the invention has been described and illustrated in conjunction with certain preferred embodiments, it will be understood that variations and modifications may be made without departing from the spirit of the invention and from the scope of the claims which follow.

Having thus described and illustrated the invention, what is claimed is:

1. A combined pickup truck and camper comprising:
   A. a cab and a bed having front, side and end walls and a floor;
   B. form retaining panels mounted just inside the side and end walls having a down position in which the top thereof is no higher than said walls and an up or camper position;
   C. means for moving said panels from the down position to the camper position; and
   D. a removable sectional top member capable of being stored in the bed just behind the cab which is adapted to cover the bed when the panels are in the down position and the panels in the camper position.

2. A combined pickup truck and camper as set forth in claim 1 in which said side walls comprise an outer wall and a spaced inner wall forming a well between them and said side panels lie in said wells in the down position.

3. A combined pickup truck and camper as set forth in claim 1 in which said side panels include transparent material.

4. A combined pickup truck and camper as set forth in claim 1 in which said bed includes covered wheel wells forming humps in the floor adjacent to and intermediate of said side walls, each side panel being constructed of a front section ahead of said wheel hump, a center section above it and a rear section behind it.

5. A combined pickup truck and camper as set forth in claim 4 in which said center section comprises a plurality of vertically slidable parts enabling the lower edges of the front and rear sections of the side panel in the down position to reach the floor while the center section reaches the top of the hump.

6. A combined pickup truck and camper as set forth in claim 1 in which the side and end panels each comprise a plurality of vertically slidable parts enabling them in down position to reach a height no higher than the side and end walls and in the camper position to reach a height more than twice the height of the side and end walls.

7. A combined pickup truck and camper as set forth in claim 4 in which each side panel comprises four support members, one secured to the front edge of the front section, one secured to the rear edge of the front section and the front edge of the center section, one secured to the rear edge of the center section and the front edge of the rear section, and one secured to the rear edge of the rear section, each support member comprising a plurality of relatively slidable lengths, and said means for moving said side panels comprising drive means to move said support members up and down to raise and lower said side panel sections.

8. A combined pickup truck and camper as set forth in claim 1 in which said top comprises a plurality of transverse sections, each section being no wider than the height of said side walls, and being extendable to cover the bed when the panels are in their down position and the camper when they are in their camper position.

9. A combined pickup truck and camper as set forth in claim 8 in which said transverse sections are so connected together as to resist penetration of water between them.

10. A combined pickup truck and camper as set forth in claim 1 in which each side panel has a top rail with a channel in its inner side and said top member includes support rollers slidable in said channel.

11. A combined pickup truck and camper as set forth in claim 10 in which the top member is so connected to said rails as to resist penetration of water.

12. A combined pickup truck and camper as set forth in claim 7 in which said drive means includes a rack on at least two of said support members, a pinion in mesh with each rack, and pinion drive means for each pinion.

13. A combined pickup truck and camper as set forth in claim 12 in which said pinion drive means is an electric motor.

14. A combined pickup truck and camper as set forth in claim 13 in which said electric motor has a circuit including a switch located is said cab to turn the electricity to said motor on and off.

15. A combined pickup truck and camper as set forth in claim 1 in which the front wall is the back of the cab of the truck.

16. A combined pickup truck and camper as set forth in claim 1 in which said end wall is a hinged tailgate and said end panel is secured to and movable with said tailgate to form, in the up position, an entrance into said camper.

17. A combined pickup truck and camper as set forth in claim 16 in which said tailgate is hinged at a side to open horizontally.

18. A combined pickup truck and camper as set forth in claim 16 in which said tailgate is hinged at the bottom to open vertically.

19. A combined pickup truck and camper as set forth in claim 1 in which said means for moving said side panels include two spaced mechanisms, each including a pivoted bar having a roller secured to its upper end, a fixed pivot at its lower end, means forming a horizontal groove for said roller at the bottom of said side panel, and means to rotate said bar clockwise about its pivot to lower said side panel and counterclockwise to raise said side panel.

20. A combined pickup truck and camper as set forth in claim 1 in which said means for moving said side panels include an upper scissor having two arms pivoted together at an intermediate location between the two ends thereof, the upper end of one arm being pivotally connected to a fixed pivot on the lower edge of said side panel and the lower end thereof being pivoted to a threaded bushing, the upper end of said other arm having a roller secured thereto and the lower end being pivoted to a socket, means forming a horizontal channel for said roller along the lower edge of said side panel, a like lower scissor having the upper end of one arm connected to said socket and its lower end having a roller secured thereto, the upper end of said other arm being secured to said threaded bushing and its lower end being pivotally secured to a fixed pivot at the floor level, means forming a horizontal groove at floor level for said second roller, a threaded bar in said bushing having a ball at one end in said socket and means at the other end to rotate said bar clockwise and counterclockwise to lengthen and shorten the distance between the bushing and the socket.

21. A combined pickup truck and camper comprising:
   A. a cab and a bed having front, side and end walls and a floor;
   B. form retaining panels mounted just inside the side and end walls having a down position in which the top thereof is no higher than said walls and an up or camper position; and C. means for moving said panels from the down position to the camper position.

22. A combined pickup truck and camper as set forth in claim 21 which includes means adapted to cover said side walls when in camper position and said bed when in down position.

23. A combined pickup truck and camper as set forth in claim 21 in which said side panels include transparent material.

24. A combined pickup truck and camper as set forth in claim 21 in which said bed includes covered wheel wells forming humps in the floor adjacent to and intermediate of said side walls, each side panel being constructed of a front section ahead of said wheel hump, a center section above it and a rear section behind it.

25. A combined pickup truck and camper as set forth in claim 24 in which said center section comprises a plurality of vertically slidable parts enabling the lower edges of the front and rear sections of the side panel in the down position to reach the floor while the center section reaches the top of the hump.

26. A combined pickup truck and camper as set forth in claim 24 in which the side and rear panels each comprise a plurality of vertically slidable parts enabling them in down position to reach a height no higher than the side and end walls and in the camper position to reach a height more than twice the height of the side and end walls.

27. A combined pickup truck and camper as set forth in claim 21 in which said means for moving said panels comprises racks and pinions driven by electric motors.

28. A combined pickup truck and camper as set forth in claim 21 in which said side panels comprise front, middle and back sections and the means for moving said side panels comprises arms having a pivot at their lower ends, a roller at their upper ends adapted to move in a groove at the lower edges of said front and back sections, and means to move each arm about its pivot.

29. A combined pickup truck and camper as set forth in claim 21 in which said side panels comprise front, middle and back sections and said means for moving said side panels comprises scissor means associated with each front and back section of said side panels.

* * * * *